US012639587B2

(12) United States Patent
Kim et al.

(10) Patent No.: US 12,639,587 B2
(45) Date of Patent: May 26, 2026

(54) METHODS AND SYSTEMS FOR ONTOLOGY CONSTRUCTION WITH AI-MEDIATED CROWDSOURCING AND CONCEPT MINING FOR HIGH-LEVEL ACTIVITY UNDERSTANDING

(71) Applicant: Robert Bosch GmbH, Stuttgart (DE)

(72) Inventors: Ji Eun Kim, Pittsburgh, PA (US);
Kevin H. Huang, Pittsburgh, PA (US);
Alessandro Oltramari, Pittsburgh, PA (US)

(73) Assignee: Robert Bosch GmbH (DE)

( * ) Notice: Subject to any disclaimer, the term of this patent is extended or adjusted under 35 U.S.C. 154(b) by 575 days.

(21) Appl. No.: 17/956,514

(22) Filed: Sep. 29, 2022

(65) Prior Publication Data

US 2024/0112044 A1    Apr. 4, 2024

(51) Int. Cl.
G06N 5/022        (2023.01)

(52) U.S. Cl.
CPC ..................................... G06N 5/022 (2013.01)

(58) Field of Classification Search
CPC ........... G06F 16/3329; G06F 16/24522; G06F 16/288; G06F 16/35; G06F 40/30; G06F 40/20; G06F 40/284; G06N 5/022; G06N 20/00; G06N 3/08; G06N 3/09
See application file for complete search history.

(56) References Cited

U.S. PATENT DOCUMENTS 11,037,024 B1 *  6/2021  Ratti ......................... G06T 7/11
11,068,713 B1    7/2021  Li et al.

11,599,714 B2    3/2023  Munro et al.
2012/0284259 A1 *  11/2012  Jehuda ................ G06F 16/3338
                                                          707/769
2014/0211044 A1 *  7/2014  Lee ......................... H04N 23/80
                                                          348/231.99
2016/0179945 A1 *  6/2016  Lastra Diaz .......... G06F 16/284
                                                          707/739
(Continued)

FOREIGN PATENT DOCUMENTS

CN          111566654 B   * 10/2023   ......... G06F 16/3331

OTHER PUBLICATIONS

Muppalla, RoopTeja, et al. "A knowledge graph framework for detecting traffic events using stationary cameras." Proceedings of the 2017 ACM on Web Science Conference. 2017. (Year: 2017).*
(Continued)

*Primary Examiner* — Dennis Truong
(74) *Attorney, Agent, or Firm* — Dickinson Wright PLLC

(57)        ABSTRACT

Methods and system of building and augmenting a knowledge graph regarding ontology of events occurring in images. Image data corresponding to a plurality of scenes captured by one or more cameras is received. A knowledge graph is built with event-based ontology data corresponding to events occurring in the plurality of scenes. One or more of the scenes is displayed to a plurality of crowdsourcing workers which provide natural-language input including event-based semantic annotations corresponding to the scene. Using natural language processing on the input, triples are generated. The knowledge graph is augmented with the generated triples to yield an augmented knowledge graph for use in determining event-based ontology associated with the plurality of scenes.

18 Claims, 12 Drawing Sheets

(56) References Cited

U.S. PATENT DOCUMENTS

| | | | |
|---|---|---|---|
| 2018/0190111 A1 | 7/2018 | Green et al. | |
| 2018/0210913 A1* | 7/2018 | Beller | G06F 16/9024 |
| 2018/0373980 A1* | 12/2018 | Huval | G06F 18/41 |
| 2019/0228262 A1* | 7/2019 | Gonzalez | A63F 13/65 |
| 2019/0354544 A1* | 11/2019 | Hertz | G06N 5/025 |
| 2020/0097602 A1* | 3/2020 | Ristoski | G06N 3/045 |
| 2020/0166897 A1 | 5/2020 | Campos et al. | |
| 2020/0167653 A1 | 5/2020 | Manjunath et al. | |
| 2020/0167689 A1* | 5/2020 | Pojman | G06V 20/176 |
| 2021/0287103 A1 | 9/2021 | Bangalore et al. | |
| 2022/0012518 A1* | 1/2022 | Sutherland | G06F 18/2148 |
| 2022/0067405 A1 | 3/2022 | Kim | |
| 2022/0067406 A1* | 3/2022 | Hotson | G08G 1/0116 |
| 2022/0138185 A1* | 5/2022 | Tran | G06N 3/044 |
| | | | 706/18 |
| 2022/0230625 A1 | 7/2022 | Zhu | |
| 2022/0269863 A1 | 8/2022 | Araki | |
| 2022/0343903 A1 | 10/2022 | Mostafazadeh et al. | |
| 2023/0117932 A1* | 4/2023 | Geiger | G06V 10/764 |
| | | | 706/12 |
| 2023/0162515 A1 | 5/2023 | Kozlowski et al. | |
| 2023/0252700 A1 | 8/2023 | Barlew | |
| 2023/0325427 A1 | 10/2023 | Budhraja et al. | |
| 2024/0073159 A1* | 2/2024 | Bhatia | G06F 16/3329 |
| 2024/0112044 A1 | 4/2024 | Kim | |
| 2024/0355130 A1 | 10/2024 | Sunderland et al. | |

OTHER PUBLICATIONS

Bakaev, Maxim, Sebastian Heil, and Martin Gaedke. "Distributional Ground Truth: Non-Redundant Crowdsourcing Data Quality Control in UI Labeling Tasks." arXiv preprint arXiv:2012.13546 (2020). (Year: 2020).*

S. Ulbrich, T. Menzel, A. Reschka, F. Schuldt and M. Maurer, "Defining and Substantiating the Terms Scene, Situation, and Scenario for Automated Driving," 2015 IEEE 18th International Conference on Intelligent Transportation Systems, Gran Canaria, Spain, 2015, pp. 982-988 (Year: 2015).*

Halilaj, Lavdim, et al. "A knowledge graph-based approach for situation comprehension in driving scenarios." European Semantic Web Conference. Cham: Springer International Publishing, pp. 699-716; 2021 (Year: 2021).*

Mandal, Vishal, et al. "Artificial intelligence-enabled traffic monitoring system." Sustainability 12.21 (2020): 9177. (Year: 2020).*

Qasemi, Ehsan, and Alessandro Oltramari. "Intelligent traffic monitoring with hybrid ai." arXiv preprint arXiv:2209.00448 (2022). (Year: 2022).*

Hahremannezhad, Hadi, Hang Shi, and Chengjun Liu. "Real-time accident detection in traffic surveillance using deep learning." 2022 IEEE international conference on imaging systems and techniques (IST). IEEE, 2022. (Year: 2022).*

Scarselli et al., "The Graph Neural Network Model", IEEE Transactions on Neural Networks, vol. 20, No. 1, Jan. 2009, 20 pages.

Gamanayake et al., "Cluster Pruning: An Efficient Filter Pruning Method for Edge AI Vision Applications", arXiv:2003.02449v1 [cs.CV] Mar. 5, 2020, 17 pages.

Haller et al., "The Modular SSN Ontology: A Joint W3C and OGC Standard Specifying the Semantics of Sensors, Observations, Sampling, and Actuation", Semantic Web X (2018) 1-0X, 24 pages.

Ma et al., "Towards Generalizable Neuro-Symbolic Systems for Commonsense Question Answering", Proceedings of the First Workshop on Commonsense Inference in Natural Language Processing, pp. 22-32 Hongkong, China, Nov. 3, 2019, 11 pages.

Weinberger et al., "Feature Hashing for Large Scale Multitask Learning", Proceedings of the 26th International Conference on Machine Learning, Montreal, Canada, 2009, 8 pages.

Sap et al., "ATOMIC: An Atlas of Machine Commonsense for If-Then Reasoning", The Thirty-Third AAAI Conference on Artificial Intelligence (AAAI-19), 9 pages.

Lin et al., "KagNet: Knowledge-Aware Graph Networks for Commonsense Reasoning", Proceedings of the 2019 Conference on Empirical Methods in Natural Language Processing and the 9th International Joint Conference on Natural Language Processing, pp. 2829-2839, Hong Kong, China, Nov. 3-7, 2019, 11 pages.

Liu et al., "ROBERTa: A Robustly Optimized BERT Pretraining Approach", arXiv:1907.11692v1 [cs.CL] Jul. 26, 2019, 13 pages.

Oltramari et al., "Neuro-symbolic Architectures for Context Understanding", arXiv:2003.04707v1 [cs.AI] Mar. 9, 2020, 18 pages.

Walton et al., "LiveLayer—Live Traffic Projection onto Maps", EUROGRAPHICS 2011/ R. Laramee and I. S. Lim, 2 pages.

Website for https://www.cnn.com/2021/07/28/politics/infrastructure-bill-explained/index.html, retrieved on Jul. 13, 2022, 5 pages.

Chowdhury et al., "Towards Leveraging Commonsense Knowledge for Autonomous Driving", 2021, 5 pages.

Ilievski et al., "Consolidating Commonsense Knowledge", arXiv:2006.06114v2 [cs.AI] Jun. 22, 2020, 14 pages.

Gori et al., "A New Model for Learning in Graph Domains", Proceedings. 2005 IEEE international joint conference on neural networks, vol. 2, pp. 729-734, 2005, 6 pages.

Chan-Tong Lam et al., "A Real-Time Traffic Congestion Detection System Using On-Line Images," 2017 17th IEEE International Conference on Communication Technology, pp. 1548-1552.

RoopTeja Muppalla et al., "A Knowledge Graph Framework for Detecting Traffiffic Events Using Stationary Cameras," Dated Jun. 25, 2017, 7 Pages.

Chelsea Lancelle, "Distributed Acoustic Sensing for Imaging Near-Surface Geology and Monitoring Traffic at Garner Valley, California," 2016, 109 Pages.

Mandal et al., "Object Detection and Tracking Algorithms for Vehicle Counting: A Comparative Analysis", Journal of Big Data Analytics in Transportation (Year: 2020).

Santhosh et al., "Trajectory-Based Scene Understanding Using Dirichlet Process Mixture Model", IEEE Transactions on Cybernetics, vol. 51, No. 8, pp. 4148-4161 (Year: 2021).

Gorur D, Rasmussen CE. "Dirichlet process Gaussian mixture models: Choice of the base distribution". Journal of Computer Science and Technology 25(4): 615626 Jul. 2010 (Year: 2010).

* cited by examiner

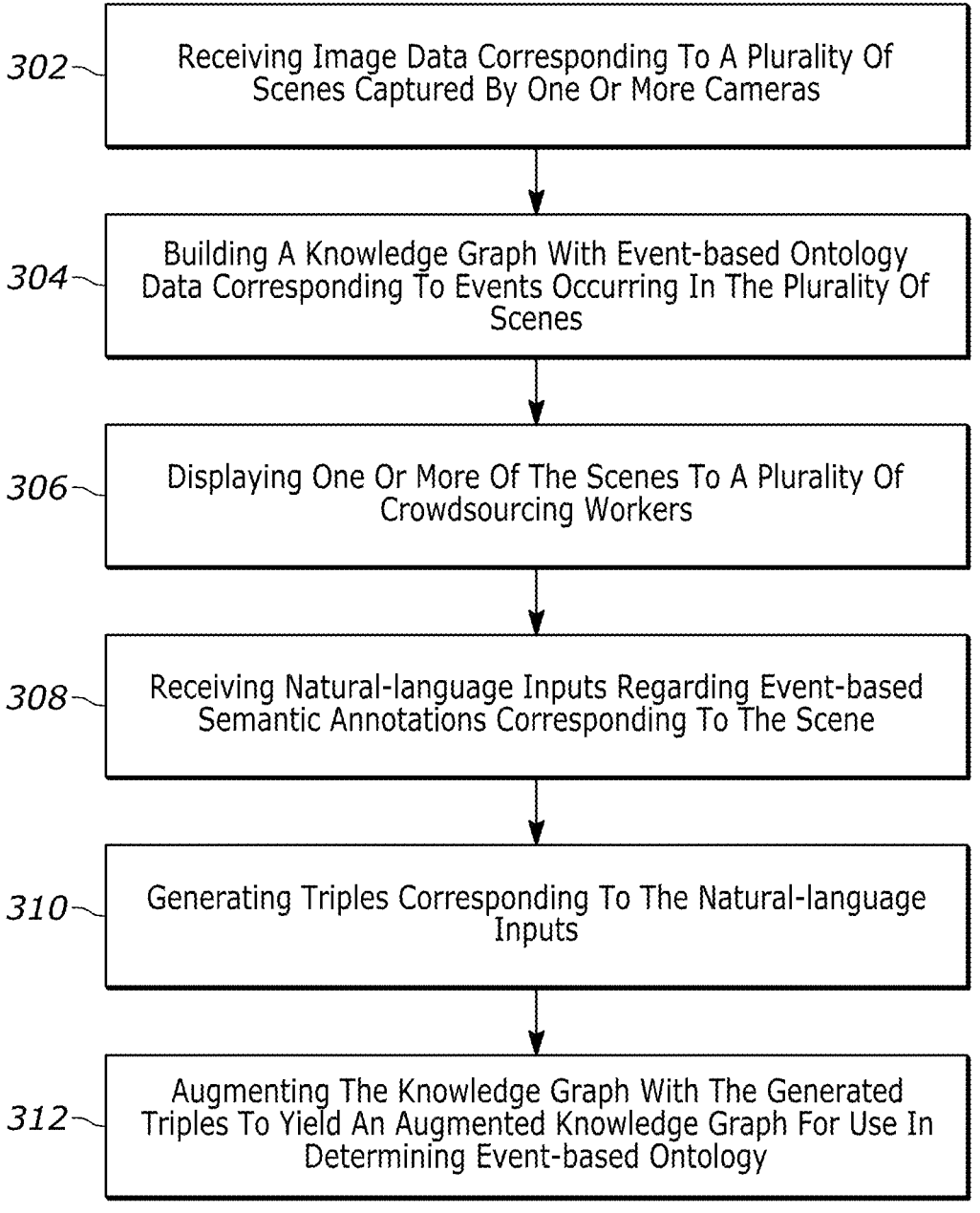

302 — Receiving Image Data Corresponding To A Plurality Of Scenes Captured By One Or More Cameras 304 — Building A Knowledge Graph With Event-based Ontology Data Corresponding To Events Occurring In The Plurality Of Scenes 306 — Displaying One Or More Of The Scenes To A Plurality Of Crowdsourcing Workers 308 — Receiving Natural-language Inputs Regarding Event-based Semantic Annotations Corresponding To The Scene 310 — Generating Triples Corresponding To The Natural-language Inputs 312 — Augmenting The Knowledge Graph With The Generated Triples To Yield An Augmented Knowledge Graph For Use In Determining Event-based Ontology

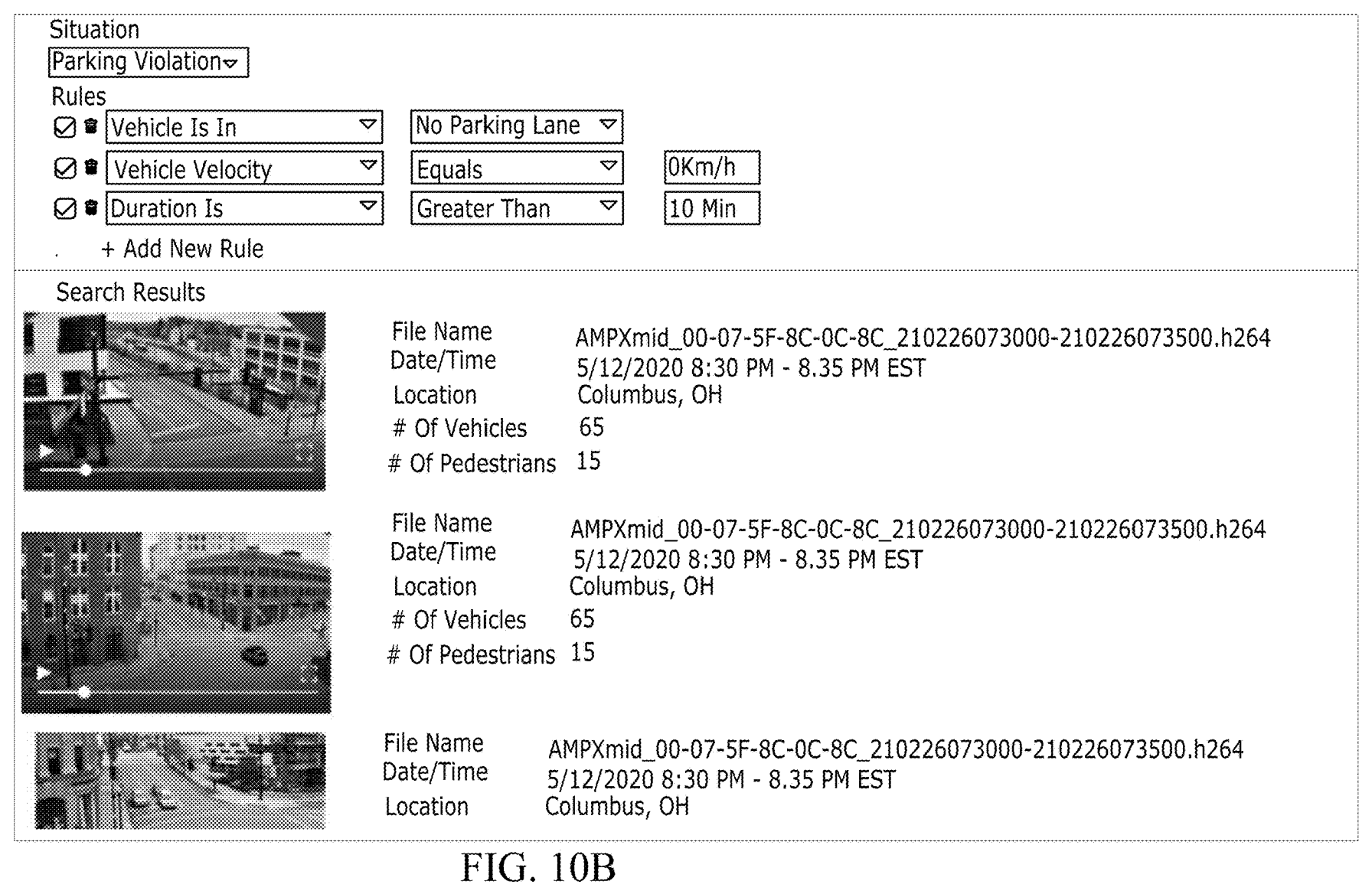

Situation

Parking Violation▽

Rules

▢ Vehicle Is In ▷    No Parking Lane ▷

▢ Vehicle Velocity ▷    Equals ▷    0Km/h

▢ Duration Is ▷    Greater Than ▷    10 Min

+ Add New Rule

Search Results

File Name    AMPXmid_00-07-5F-8C-0C-8C_210226073000-210226073500.h264
Date/Time    5/12/2020 8:30 PM - 8.35 PM EST
Location    Columbus, OH
Of Vehicles    65
Of Pedestrians    15

File Name    AMPXmid_00-07-5F-8C-0C-8C_210226073000-210226073500.h264
Date/Time    5/12/2020 8:30 PM - 8.35 PM EST
Location    Columbus, OH
Of Vehicles    65
Of Pedestrians    15

File Name    AMPXmid_00-07-5F-8C-0C-8C_210226073000-210226073500.h264
Date/Time    5/12/2020 8:30 PM - 8.35 PM EST
Location    Columbus, OH

FIG. 10B

METHODS AND SYSTEMS FOR ONTOLOGY CONSTRUCTION WITH AI-MEDIATED CROWDSOURCING AND CONCEPT MINING FOR HIGH-LEVEL ACTIVITY UNDERSTANDING

TECHNICAL FIELD

The present disclosure relates to methods and systems for ontology construction with AI-mediated crowdsourcing and concept mining that enables computerized understanding of high-level activity occurring in scenes of images.

BACKGROUND

Intelligent traffic management systems, also referred to as intelligent traffic monitoring (ITMo), may be used to improve safety, traffic flow, and overall system efficiency. These systems are typically implemented to reduce congestion, react to incidents that impact traffic flow, and provide insight into traffic patterns. The abundance of real-time data points can be used to make traffic mitigation strategies more efficient and effective. ITMo systems are also an important instrument to improve road safety and security; they can focus on deriving actionable knowledge from networks of sensors deployed along highways, city roads and intersections.

Natural language processing (NLP) is a type of artificial intelligence concerned with interactions between computers and human language, in particular how computers can process and analyze a natural language that is spoken or written. One goal of NLP is a computer system capable of receiving a natural-language input, understanding the contents and intent of the input, and processing stored data based on the understood content and intent so that an output can be provided similar to what a human would output.

SUMMARY

According to one embodiment, a method of building and augmenting a knowledge graph regarding ontology of events occurring in images. The method includes receiving image data corresponding to a plurality of scenes captured by one or more cameras; building a knowledge graph with event-based ontology data corresponding to events occurring in the plurality of scenes; displaying one or more of the scenes to a plurality of crowdsourcing workers; receiving natural-language inputs from the plurality of crowdsourcing workers, wherein the natural-language input includes event-based semantic annotations corresponding to the scene; via natural-language processing, generating triples corresponding to the natural-language inputs, wherein each of the triples includes a subject, a predicate, and an object; and augmenting the knowledge graph with the generated triples to yield an augmented knowledge graph for use in determining event-based ontology associated with the plurality of scenes.

In another embodiment, a system of building and augmenting a knowledge graph regarding ontology of events occurring in images is provided. The system includes one or more image sensors configured to capture images of a plurality of scenes. The system includes a plurality of user interfaces configured to receive inputs from crowdsourcing workers. The system includes one or more processors programmed to: build a knowledge graph with event-based ontology data corresponding to events occurring in the plurality of scenes; display the scenes to the crowdsource workers via the user interfaces; receive natural-language inputs from the crowdsource workers, wherein the natural-language input includes event-based semantic annotations corresponding to the displayed scenes; utilize natural-language processing to generate triples corresponding to the natural-language inputs; and augment the knowledge graph with the generated triples to yield an augmented knowledge graph for use in determining event-based ontology.

In another embodiment, a method of augmenting a knowledge graph with ontology information regarding events occurring in images is provided. The method includes: retrieving, from memory, a knowledge graph with event-based ontology data corresponding to events occurring in a plurality of scenes captured by one or more cameras; displaying one or more of the scenes to a plurality of users; receiving natural-language inputs from the plurality of users, wherein the natural-language input includes event-based semantic annotations describing a portion of the scene; via natural-language processing, generating triples corresponding to the natural-language inputs; and augmenting the knowledge graph with nodes corresponding to one or more words of the generated triples in order to yield an augmented knowledge graph for use in determining event-based ontology.

BRIEF DESCRIPTION OF THE DRAWINGS

FIG. 3 illustrates a flowchart of an algorithm implemented by the systems of FIGS. 1 and 2, according to an embodiment.

FIGS. 10A and 10B illustrate a user interface for a user to search for various events based on the trajectories, such as traffic jams and parking violations, according to embodiments.

DETAILED DESCRIPTION

Figure 1:
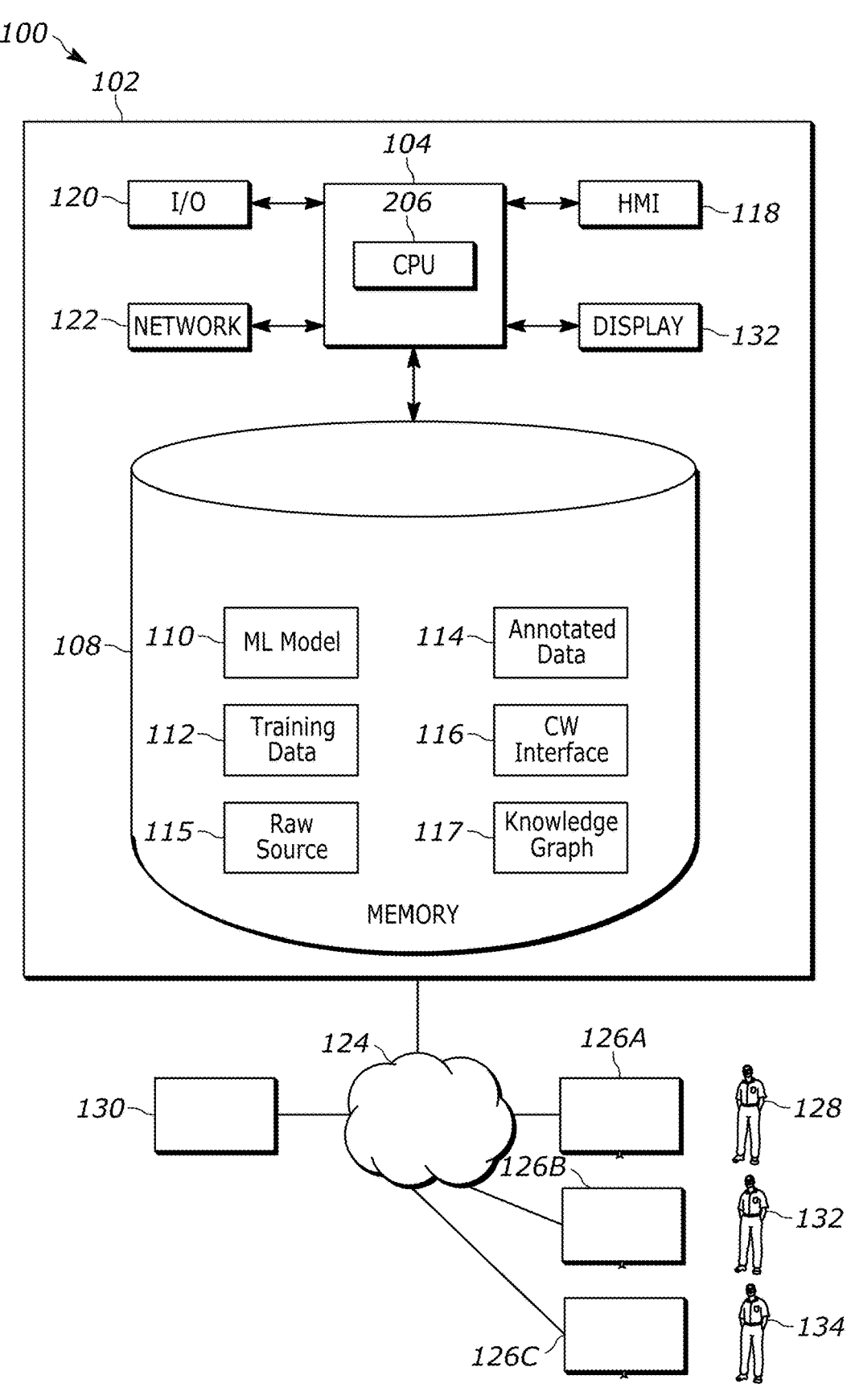
FIG. 1 illustrates a possible configuration for a system for building and augmenting a model regarding ontology of high-level activities or events occurring in scenes shown in images, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modeling domain knowledge using semantic technologies is a hard, time-consuming task, as it requires knowledge engineers who are versed in computational ontology and logics but not in specific domains of interest, to collaborate with experts that—conversely—do not typically have a preparation on formal methods but have in-depth knowledge of their professional sector. This problem becomes even more difficult when modeling commonsense knowledge is necessary, since cultural aspects and linguistic practices become an important factor.

For instance, consider an example of modeling events concerning vehicle traffic (e.g., traffic jams, accidents, near-misses of accidents, etc.) Modeling these events to determine potential root causes could be described differently by different people, depending on their culture, backgrounds, and perspective (e.g. a driver's perspective is different from a law enforcement agent's perspective or a city regulator's perspective). Simply put, when building the model on contextual information, how one person describes a traffic accident might differ from how another person might describe it. Collective intelligence is therefore needed to be able to model high-level activities to address diverse scenarios.

Crowdsourcing can empower knowledge engineers when collecting these diverse scenarios and relevant information and/or concepts to address significant facts needed for modeling if a crowdsourcing task is effectively designed with machine intelligence and information representation. Furthermore, the quality of the description of high-level activities and/or scenarios as seen in the images may vary depending on how questions are organized, how the input data or prior knowledge or context is represented to crowd, and how the guidance or supplements are provided to crowd.

Having a smart way to summarize and represent the collected information from previous human workers with natural language processing and to guide next workers to be able to provide new information will allow knowledge engineers to effectively model the high level activities with common sense knowledge possessed by crowd. The approaches described herein aim to increase the efficiency and coverage of high-level activities and relevant information such as causes in ontology and knowledge graph construction.

Various embodiments are disclosed herein regarding systems and methods of ontology construction with AI-mediated crowdsourcing and concept mining to empower knowledge engineers and expedite the modeling process. This disclosure can be used for high-level activity understanding where the root causes and/or patterns cannot be easily classified purely by computer algorithms or machine learning. Instead, the present disclosure introduces a hybrid approach with machine perception and prediction, and symbolic reasoning such as semantic models and rules.

According to embodiments this disclosure provides systems and methods including (i) crowdsourcing tasks to collect knowledge-graph primitives for a specific high-level activity or situation (e.g., traffic accident), (ii) natural language processing integrated to the crowdsourcing tasks to enable efficient and diverse collection from crowd, and (iii) concept mining with natural language processing and knowledge-graph generation and augmentation to assist knowledge engineers to model high-level activities or situations more effectively.

Referring to the Figures, FIG. 1 illustrates a system 100 for building and augmenting a model regarding ontology of high-level activities or situations occurring in images. In other words, the system 100 can be configured to determine events that occur in a scene shown in one or more images, by using a fusion of human input and machine-learning modeling. The system 100 can include structure similar to that disclosed in U.S. patent application Ser. No. 17/871,335 titled HUMAN-ASSISTED NEURO-SYMBOLIC OBJECT AND EVENT MONITORING, the entire disclosure of which is incorporated by reference herein. In particular, the system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction set such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, an annotated dataset 114 for storing results of the data annotation, raw source dataset 115, and a crowd worker interface 116 process.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 (e.g., each containing their own computer, processor, memory, etc.) may be in communication with the external network 124.

The computing system 102 may include an input/output (I/O) interface 120 configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices (e.g., microphone), and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems 102. While the example depicts a single computing system 102 that implements all of the described features, it is intended that various features and functions may be separated and implemented by multiple computing units in communication with one another. The particular system architecture selected may depend on a variety of factors. As an example, the crowd worker interface 116 process could be implemented on a separate computing system.

Crowd workers 128, also referred to as crowdsourcing workers, may utilize workstations 126 to access the external network 124. The crowd workers 128 may also be referred to as task executors. Crowd workers 128 may not be expected to have any specific domain expertise. The crowd workers 128 may be registered in one or more crowdsourcing markets such as Amazon Mechanical Turk, UpWork, Clickworker, or the like. The crowdsourcing market may be implemented on one of the servers 130. The crowdsourcing market may allow a task requestor to upload tasks for completion by the crowd workers 128. The crowd workers 128 may access the crowdsourcing market using the workstations 126. The workstations 126 may include components similar to the computing system 102. The workstations 126 may be personal computing devices including a user interface for input and output. The workstations 126 may include a display device. For example, the workstations 126 may be computers having a display and keyboard. The workstations 126 may include tablets and cell phones.

The HANS system 100 may implement a machine-learning algorithm 110 that is configured to analyze the raw source dataset 115 to generate the annotated dataset 114. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In one example, the raw source dataset 115 is image data corresponding to images or videos that display a scene, such as a traffic intersection, lanes of traffic near a stoplight, a portion of a highway, etc. In other examples, the raw source dataset 115 may include radar, LiDAR, ultrasonic and motion sensor data. In some examples, the machine-learning algorithm 110 may be a neural network algorithm that is designed to perform a predetermined function. For example, the neural network algorithm may be configured in automotive applications to identify vehicles or pedestrians in video images. The machine-learning algorithm 110 may be configured to generate the annotated dataset 114 for use by other machine-learning systems. For example, the annotated dataset 114 may be used as a training data for a high-level activity understanding for traffic applications (e.g. in determining events that occur in the scenes).

The annotated dataset 114 may include annotations in addition to the raw source dataset 115. For example, when the raw source dataset 115 is video images, several frames incorporated into the annotated dataset 114 may have corresponding annotations. The annotations may include descriptions that are associated with identified coordinates of the image frame. For example, the annotations may include bounding boxes for particular features. The annotations may include color coding of particular features. The annotations may define text labels or descriptions for features found in the image. The annotations may define details regarding the context of the image, such as the presence of certain events such as traffic jams, traffic accidents, and the like.

The system 100 may store the training dataset 112 for the machine-learning algorithm 110. Alternatively, the training dataset 112 may be stored in a memory separate from the system 100, and instead the system 100 utilizes a fully-trained machine-learning system. The training dataset 112 may represent a set of previously annotated data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In an example, the machine-learning algorithm 110 may be designed to identify the presence and location of pedestrians or vehicles in video images and annotate the data accordingly. And, as will be described further below, the machine-learning systems utilized in conjunction with the system 100 may be designed to determine the presence of a certain defined event such as a traffic jam, a traffic accident, or the like based on the context of objects in the image (e.g., the number of vehicles in the scene, the relative speed of the vehicles, the speed of vehicles within a certain area of the scene (e.g., intersection), or the like). In this example, the training dataset 112 may include source videos with and without objects (e.g., vehicles, pedestrians, etc.) and corresponding presence and location information. The source videos may include various scenarios in which such events are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations) with those included in the training dataset 112. Since the training dataset 112 includes the expected results, the machine-learning algorithm 110 can determine when performance is acceptable. After the machine-learning algorithm 110 achieves a predetermined performance level (e.g., convergence, near 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of an event such as a traffic jam in video images and annotate the occurrences. The machine-learning algorithm 110 may be programmed to process the raw source data 115 to identify the presence of particular contextual features in the scene corresponding to the event. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system that is using the annotated dataset 114, or the raw source data 115 may be machine generated for testing the data annotation system. As an example, the raw source data 115 may include raw video images from a camera.

In the example, the machine-learning algorithm 110 may process the raw source data 115 and output an indication of the presence of a pedestrian. The output may also include a relative behavior of the pedestrian within the video images, utilizing the HANS system described herein. Such information may be part of the annotation. The machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

The computing system 102 may further include a crowd worker interface process 116 that is programmed to provide an interface between the machine-learning algorithm 110 and the crowd workers 128 (via the work stations 126). The crowd worker interface 116 may be predefined and/or programmed by the developer of the system 100. The developer may identify a predetermined set of prompts or scripted dialogs to allow a human to confirm, annotate or assist the accuracy of the data in the knowledge graph, for example. The scripted dialogs may include a particular request to the crowd worker 128 to provide input in a particular manner. For example, for describing scenes shown in the images, the crowd worker interface 116 may request that the crowd worker 128 confirm a behavior of an object in the image. For example, a prompt may ask the crowd worker 128: "Is this vehicle driving normal or erratically?" or "What caused this accident?" The input provided by the crowd worker 128 may be in the form of text. In other examples, the crowd worker interface 116 may request the crowd worker 128 to point and click on areas of interest on the displayed image. The crowd worker interface 116 may be configured to identify each type of error that causes inaccuracies in the machine-learning algorithm 110. The crowd worker interface 116 may monitor operation of the machine-learning algorithm 110 to detect conditions in which an inaccuracy may be present. For example, the crowd worker interface 116 may access internal variables of the machine-learning algorithm 110 to determine the accuracy and performance.

A crowd worker 128 may be able to process the raw source data 115 to determine if the particular feature is present, and/or what the context is surrounding a particular event shown in the images. For a visual task, the crowd worker 128 may be able to reliably indicate the presence of the particular feature (e.g., pedestrian) in the raw source data 115. In addition, when the annotation results generated by the machine-learning algorithm 110 are displayed, the crowd-worker 128 may be able to determine if the result is reasonable, reliable, or correct.

The system 100 disclosed herein is designed to easily adapt to various sensor-based domains, including indoor scenarios such as smart buildings and home surveillance, and outdoor settings, like smart cities, digital agriculture, etc. While the present disclosure might, at times, focus on applying the system 100 to vehicle traffic monitoring, it should be appreciated that the teachings herein can be applied to various non-traffic settings such as those listed above and others.

Figure 2:
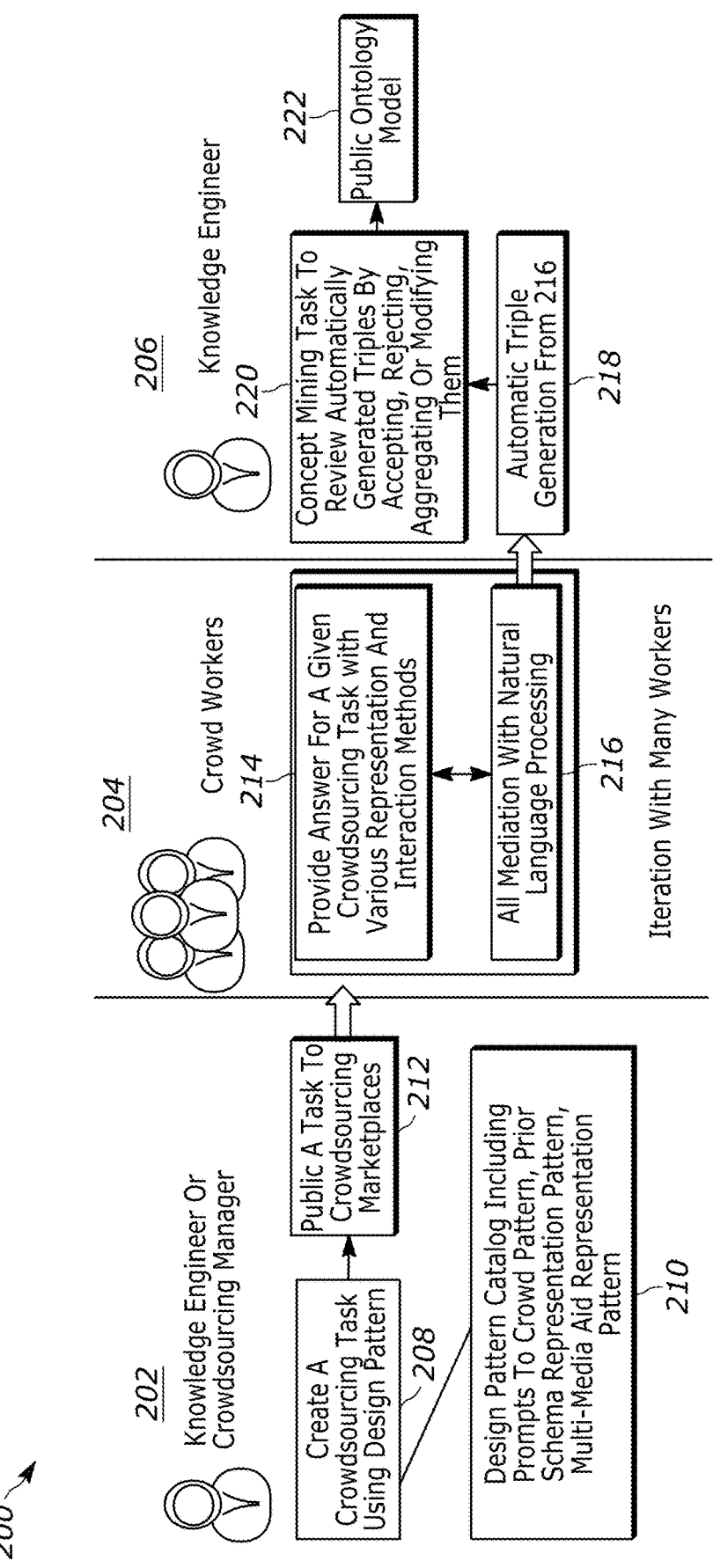
FIG. 2 illustrates a workflow of utilizing a system—such as the system of FIG. 1—for building and augmenting a knowledge graph for event-based ontology determination, according to an embodiment.

FIG. 2 illustrates a workflow of utilizing a system 200 for building and augmenting a knowledge graph for event-based ontology determination, according to an embodiment. The system 200 includes three main roles: a knowledge engineer or crowdsourcing manager 202, a plurality of crowdsourcing workers 204, and a knowledge engineer 206. The crowdsourcing manager 202, which can be executed by a knowledge engineer, creates crowdsourcing tasks to collect knowledge graph primitives for a target domain or use cases. The crowdsourcing workers 204 can be recruited via crowdsourcing marketplaces such as Amazon Mechanical Turk, UpWork, ClickWorker, social media, online or offline advertisement, or internal users of the organization. The knowledge engineer 206 reviews the knowledge graph primitives received from the crowdsourcing and machine-learning methods (e.g., natural-language processing, knowledge graphs, etc.), and finalizes the ontology of the knowledge graph model.

At 208, a crowdsourcing task is created by the crowdsourcing manager 202, knowledge engineer or relevant expert to collect diverse knowledge graph primitives. The crowdsourcing task can leverage one or more design patterns from 210. The design patterns can include one or more of the following: a prompt to crowd pattern, a prior schema representation pattern, and a visual aid representation pattern. These design patterns can be configured in software using the systems described herein. The design patterns can be sent to display on a plurality of workstations 126A for a plurality of crowdsourcing workers 128. The system supports the task creator to search design patterns catalog, select one or more design patterns, and modify or customize them for a new crowdsourcing task.

Regarding the prompts to crowd pattern, this design pattern assists crowdsourcing workers to elicit relevant knowledge graph primitives by asking questions with relevant aspects to a specific activity. For example, when eliciting knowledge graph primitives for a traffic model, the task creator may include the following aspects as prompts for crowd to direct them to all possible different scenarios of traffic backup, time of day, conditions including weather and events. The task creator can ask the crowd workers to share their experiences with respect to root causes (e.g., why they had to stop and slow down their vehicle while driving) and contextual information (e.g., routine such as rush hour or abnormal situations such as accidents), or to present a hypothetical situation to describe a traffic backup to encourage a crowd worker to think about similar situations.

Regarding the prior schema representation pattern, if any prior information exists from the previous input of crowd-sourcing workers or previously-built knowledge graphs from similar domains (e.g., traffic backups having common knowledge primitives such as long lines at a grocery store), then the crowdsourcing manager 202 can aggregate or summarize the terms or primitives and present them to the current or next batch of crowdsourcing workers, and ask the crowdsourcing workers to expand this prior schema. This design pattern can be useful to increase coverage of the similar primitives/concepts by guiding the crowdsourcing workers to provide non-redundant information.

Regarding the visual aid representation design pattern, this pattern uses images, audio, and/or video sources, or combinations of any types of multimedia, to inspire the crowdsourcing workers to provide relevant information in the crowdsourcing task design. In other words, this elicits crowd workers to provide their own ideas for eliciting information regarding a particular topic, such as traffic jams or traffic accidents.

Once a particular design pattern is selected and groomed for crowd workers, it can be published to the crowdsource workers at 212. The published task is sent to crowdsourcing marketplaces such as those described above so that crowd workers 128 can provide input.

At 214, the various crowd workers provide answers for a given crowdsourcing task with various design patterns and interaction methods. A user interface may be provided for the crowd worker to view images (i.e., either still or video), and provide feedback on the scenes depicted in the images. Manual processing and making sense of all information from prior crowd workers is extremely time consuming, and the results can be subject to human error depending on who is organizing the crowdsourcing feedback. Therefore, one or more natural language processing (NLP) technologies 216 can be relied upon to aggregate and summarize information received from crowdsourcing.

The NLP can use the CPU 106 and memory 108 described above for execution. The NLP technology can be or include Part of Speech (POC) and lemmatization to tag the words of the natural-language input based on the type (e.g., noun, adjective, verb) of words. The NLP can also rely on dependency parsing to analyze the grammatical structure of sentences, semantic role labeling to identify general semantic structures associated with n-grams of sentences, topic modeling, summarization, named entity recognition, sentiment analysis, etc.

The processed information is summarized and presented to crowd so that they can avoid redundant information when they work on the same task or validate the summarized information with positive and negative feedback. Upon the submission of a worker's task, the system processes new inputs along with previously processed information to update the summary and knowledge primitives. Depending on the representation and interaction mechanisms, the crowd worker's input is processed in real-time for immediate feedback to the worker; alternatively, the input can be processed after crowdsourcing task completion.

Representation and interaction with crowd workers can be designed variously in crowdsourcing tasks at 214. The following interaction methods are exemplary interactions and are not intended to be all-encompassing. In one embodiment, the system informs or alerts the crowd worker if the crowd worker's input is redundant, and asks the crowd worker for another answer. For example, if the crowd worker is asked to describe what caused an accident shown in a video, and the crowd worker inputs "the yellow car ran a red light," the system can reject this input if it is duplicative of an input from another crowd worker. The crowd worker will then be asked to described the scene in a different way. The redundancy can be analyzed based on the frequency of the processed terms or words appearing in the crowd's answers, similarity measurement of already-processed information and new inputs in the word level, sentence level, or semantic role level.

With input provided by the crowd workers, the system 200 can send the output of the natural language processing to 216 to a knowledge engineer at 206, wherein concept mining methods with NLP and integration with existing knowledge graphs can take place. The knowledge engineer can validate the summary or automatically-created triples from the crowdsourcing results 204. Triples can be generated at 218 based on the crowd worker's input. The system generates knowledge primitives and triples by analyzing the crowdsourcing results with various natural language processing technologies, such as those described above. The triple generator can use, for example, semantic role labeling and dependency parsing to determine the triples (e.g., subject, predicate and object). By understanding generated triples, the system can automatically add relevant triples with different relationships from existing ontology vocabularies and models such as synonyms, is—a, inverse properties, and the like. To assist the knowledge engineer 206, the triples can be generated from the results of the crowdsourcing with NLP 216. When generating triples, a concept-mining task at 220 can access the existing ontology or knowledge graphs to add new triples to the existing ontology or knowledge graphs, ignore triples redundant to triples in the existing knowledge graph, predict links to existing nodes in the knowledge graph, etc. When generating triples and NLP processing, the system keeps track of the raw data from crowd, NLP processed information and triples. The triple-generator can be executed interactively with the knowledge engineers 206 to get their feedback.

A graphical user interface can display the triples with nodes and edges, tabular form, or textual form. In case synonyms are aggregated during automatic triple generation, the tool can show the representative word/term along with synonyms so that the knowledge engineer can switch the representative word or refine triples by having additional relations between synonyms if necessary. The user interface can show traces of triples all the way down to the original raw data from crowdsourcing.

FIG. 3 illustrates a method 300 for building and augmenting a knowledge graph regarding ontology of events occurring in images, using the above teachings. The method can be performed by the one or more processors by executing instructions stored in hardware, for example using the structure shown in FIG. 1. At 302, the one or more processors receives image data corresponding to a plurality of scenes captured by one or more cameras. In embodiments in which the scene ontology is built for traffic scenes, the scenes can be of traffic intersections or roads, and the cameras can be mounted on or near street lights or highway overpasses, for example. At 304, a knowledge graph can be built with event-based ontology data corresponding to events occurring in the plurality of scenes. Examples of event-based ontology can include traffic jams, traffic accidents, parked vehicles, speeding vehicles, or erratic driving behavior, and corresponding descriptions of those events.

At 306, the one or more processors can display one or more of the scenes to a plurality of crowdsourcing workers. The display can be based on the design patterns described above as created or selected by the knowledge engineer 202. The display can show the one or more images or the scenes shown in these images, along with a prompt for the crowdsourcing worker to describe aspects of the scene. For example, the prompt may ask the crowdsourcing worker "What do you see in this scene?" or, if relying on knowledge gained from previous annotations of a scene that an accident has occurred in the scene, "What caused the accident in this scene?"

At 308, the one or more processors receives natural-language inputs from the crowdsourcing workers. The natural-language inputs are event-based semantic annotations corresponding to the scene, i.e., natural language description of the scene. The input provided by the crowdsourcing workers can be in written form (e.g., typing on a keyboard) or in spoken form (e.g., utilizing a microphone and associated transcription software that converts the spoken words into text that software can process).

At 310, triples are generated corresponding to the natural-language inputs. The triples can rely on NLP and techniques described above with reference to 218 and 220.

At 312, the one or more processors augment the knowledge graph with the generated triples. For example, new nodes and edges with the triples can be added to the knowledge graph, with the nodes or edges being originated from the natural language input, or synonyms thereof. This yields an augmented knowledge graph that can be used to determine event-based ontology of a new image without the later help of human input such as crowdsourcing.

FIGS. 4-10 describe embodiments of using object trajectory data to further build or augment a knowledge graph. The object trajectory can be of a vehicle (vehicle trajectory), a pedestrian (pedestrian trajectory), a bicyclist (bicyclist trajectory), and/or other objects that can be detected and classified when appearing in a scene captured by an image sensor such as a camera. The object being tracked can also be people in a retail store, manufacturing plant, or other commercial setting with a high level of movement or activity of the objects.

Searching for scenes with a high levels of activity such as traffic jams, parking violations, vehicular accidents, or near misses (e.g., near accidents), is not achievable with state-of-the-art computer vision or machine learning algorithms. Furthermore, processing raw data to infer high levels of activity with new algorithms would not be efficient if big data is necessary to be processed. The methods and systems disclosed herein aim to address efficient handling of big data when inferring high levels of activity by using meta-data representation from basic perception models (such as detection, classification, and tracking) and machine learning models such as clustering to abstract those representations. The outputs of these models are then converted to knowledge graph representations. Hybrid reasoning of semantic rules and machine learning models can be customized or extended for various applications with relatively smaller data size from meta data and the knowledge graph.

Figure 4:
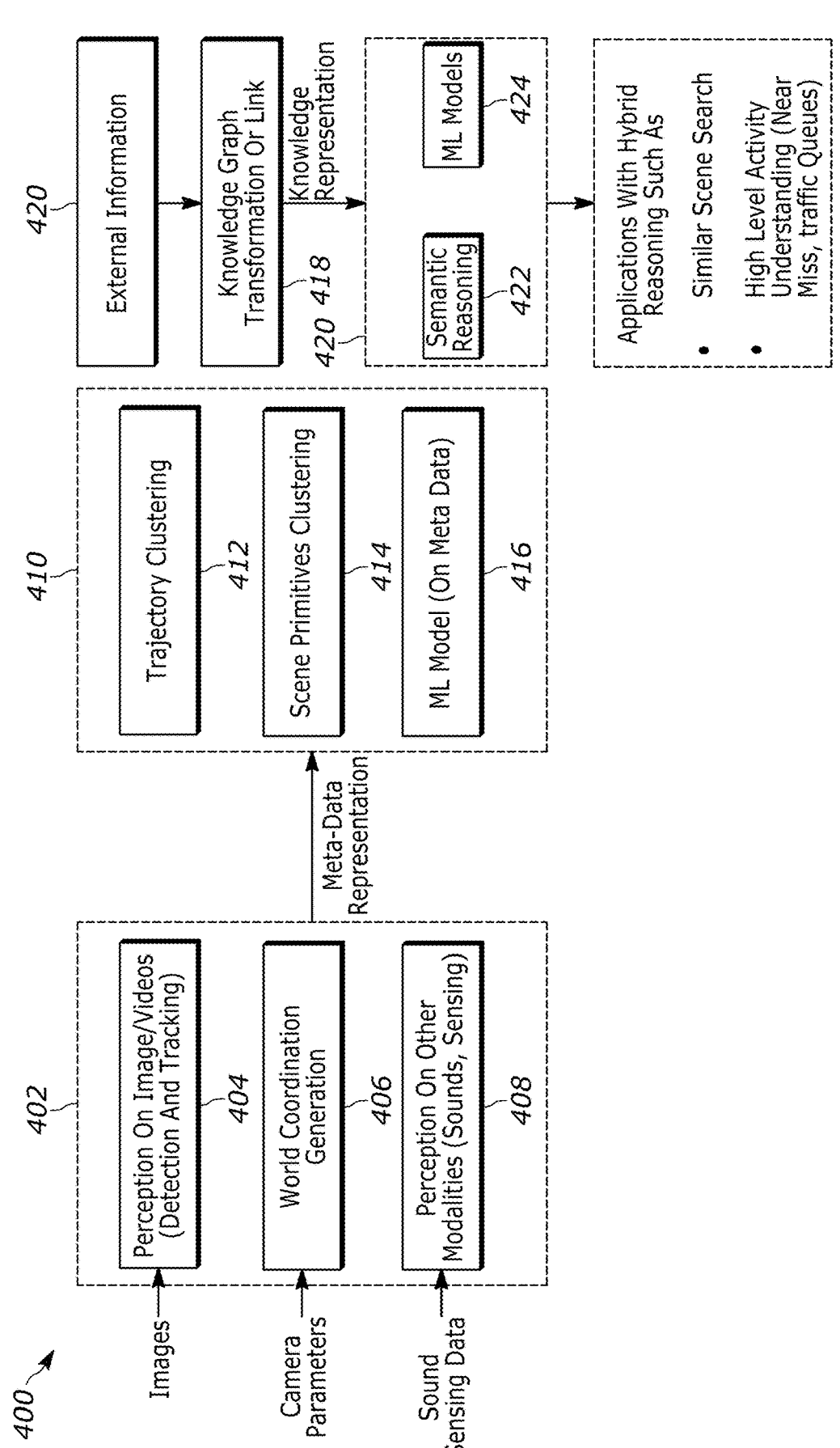
FIG. 4 illustrates a workflow of utilizing a system for using object trajectory data to further build or augment a knowledge graph, according to an embodiment.

FIG. 4 illustrates a system 400 of augmenting a knowledge graph with object trajectory data, and using the knowledge graph for scene searching according to an embodiment. The system 400 receives one or more various inputs (such as image data, image sensor parameters, and sound data, which are further described herein) can be used by various machine-learning models 402. The system 400 can be executed using the one or more processors and memory disclosed herein and shown in FIG. 1.

At 404, computer vision and machine learning models are programmed to detect objects, predict object location, object type (e.g., car, pedestrian, etc.), as well as assign the object an identifier (ID) over multiple image sequences so that its trajectory can be tracked. This can be performed using an object-tracking machine-learning model, a deep learning (e.g., convolutional neural network, CNN) model where the program takes an initial set of object-detections, develops a unique identification for each of the initial detections, and then tracks the detected objects as they move around frames in a video. This model may include a designation or detection stage wherein one or more algorithms analyze image frames to identify objects that belong to target classes (e.g., using a classifier), and placing bounding boxes on the objects to perform detections as part of the algorithm. Various object-tracking machine-learning models may be relied upon, such as OpenCV, DeepSORT, or MDNET.

At 406, in one embodiment, an algorithm or model generates world coordinates based on camera parameters, such as location of the camera, angle of view, direction of view, etc. For example, intrinsic and extrinsic camera parameters can be used to convert the trajectories (described more below) from image coordinates to world coordinates based on a distance to the detected object, a relative height between the detected object and the camera, and the like. Combining intrinsic camera parameters (e.g., the optical center and focal length of the camera) with extrinsic camera parameters (e.g., the location of the camera in the three-dimensional scene) can generate meta-data representations (e.g., bounding box positions on the image plan or world coordinates).

In one embodiment, original data ($T^0$) is obtained by object detection and tracking algorithms in world coordinate. Then, the system can assume that all image sequences start at the same time and end at the same time. The system can use $t \in [0,1]$ to denote the time index for all sequences. Then the system uses interpolation algorithms with cubic functions. For example, given a number n of known points or coordinates of detected objects, the interpoloation fills in the gaps in the data points to derive a trajectory. The gaps always exist because a trajectory has infinite points by definition, and there is only a finite number of detections (e.g., one per second, five per second, depending on frame rate, etc.). So reconstructing as many points as possible between the actual detection events increases the trajectory accuracy. The system defines T as the interpolated trajectories, which are 4-dimensional time sequences (i.e., [$x,y,v_x, v_y$]) with length 100, for example.

At 408, a machine-learning model trained with other data types such as sound can generate meta-data representations to abstract information such as classification. For example, one or more sounds received from a microphone can be assigned to a detected object in the scene, such as a loud low-pitch rumbling being assigned to a tractor trailer, or a ringing bell being assigned to a bicyclist. Fusion can also take place, where the object-detection model is assisted in its classifying of objects based on the detected sounds; a low-pitch sound can help the model assign a "truck" classification to a detected vehicle, for example.

Figures 5A, 5B, 5C, 5D, 5E, 5F:
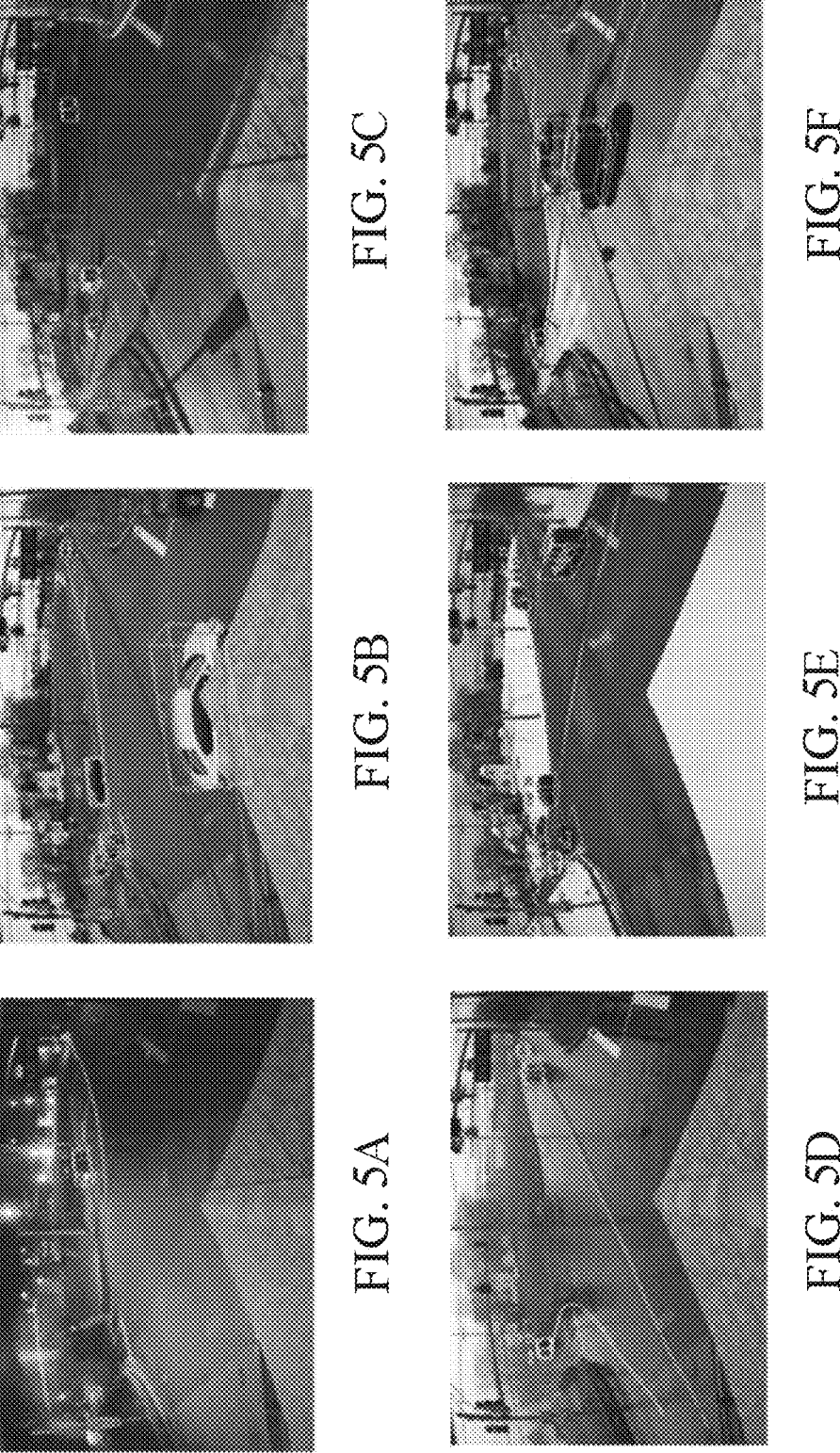
FIGS. 5A-5F are images of intersections with representations of vehicle trajectories on the image plane, according to embodiments.

All of this meta-data, after being processed by various models 402, can be represented in various formats such as XML, JSON, or domain-specific variations of those formats. Visualization of the meta-data representation on the image plane is shown in FIG. 5. FIG. 5 shows six different embodiments of meta-data representation of object trajectories on the image plane, e.g., utilizing the object-tracking machine-learning model on a traffic intersection. As each vehicle comes into the scene, its presence can be determined, and a bounding box can be placed on it. As that vehicle moves, its past location is tracked such that a trajectory line can be placed over its previous locations. Each vehicle's bounding box and trajectory line can be assigned a different color so that the model can better visualize the tracking data.

Figure 6A:
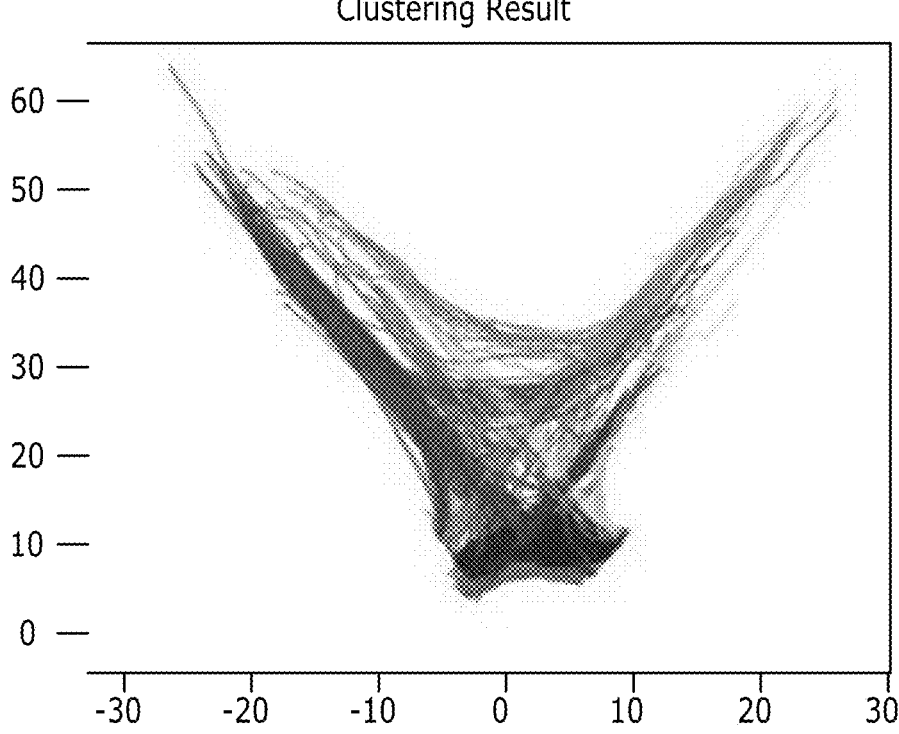
FIG. 6A is a clustering result of vehicle trajectories at an intersection.

The meta-data representations can be processed at 410 so that they are prepared for transformation or augmentation into a knowledge graph. For example, at 412, the object trajectories (e.g., determined from the object-tracking machine-learning model) can be clustered by using a clustering machine-learning model, or clustering model. The clustering model is configured to cluster the object trajectories into a plurality of clustered object trajectories, wherein each of the object trajectories is grouped with other object trajectories in one of a plurality of clusters. FIG. 6A shows the result of object trajectory clustering, for example clustering vehicle trajectories at an intersection such as the one shown in FIG. 5. The axes of FIG. 6A are location-based, such that the graph represents a two-dimensional location of the vehicles from, for example, a bird's eye view based on the meta-data explained above. As shown in FIG. 6A, each of the trajectories is grouped into a cluster, and each cluster of trajectory can be assigned a color or other identifier indicating that each trajectory in that cluster is part of a common cluster. The clustering can be based on similarity in trajectory. For example, each trajectory can be assigned to a cluster based on its similarity with one or more of the other trajectories. Various clustering models can be used, such as a Gaussian Mixture Model (GMM), K-Means clustering, Mean-shift clustering, Density-Based Spatial Clustering of Applications with Noise (DBSCAN), In one embodiment, the clustering model includes a Dirichlet Processes Gaussian Mixture Model (DPGMM). Here, an index i over a number of observations i=1, . . . , n is used, along with the index j over components j=1, . . . , K. The Gaussian Mixture Model (GMM) with K components can be written as:

$$p(T|\theta_1, \dots, \theta_K) = \sum_{j=1}^{k} \pi_j \mathcal{N}\left(T | \mu_j, \sum_j\right)$$

where $\theta_j = \{\pi_j, \mu_j, \Sigma_j\}$ is the set of parameters for component j and T is observable samples. A joint prior distribution $G_0$ is defined on the component parameters and introducing indicator variables, then DPGMM can be defined as follows:

$$\left(\mu_j, \sum_j\right) \sim G_0$$

$$\pi|\alpha \sim Dir\left(\frac{\alpha}{K}, \dots, \frac{\alpha}{K}\right)$$

$$c_i \sim \pi Discrete(\pi_1, \dots, \pi_K)$$

$$T_i|c_i\Theta \sim \mathcal{N}\left(x|\mu_{c_i}, \sum_{c_i}\right)$$

where the parameter set $\Theta = \{\theta_1, \dots, \theta_K\}$ and $c_i$ are indicator variables. The parameters of this model can be trained with a variational inference method (e.g., variational Bayesian method).

Figure 8:
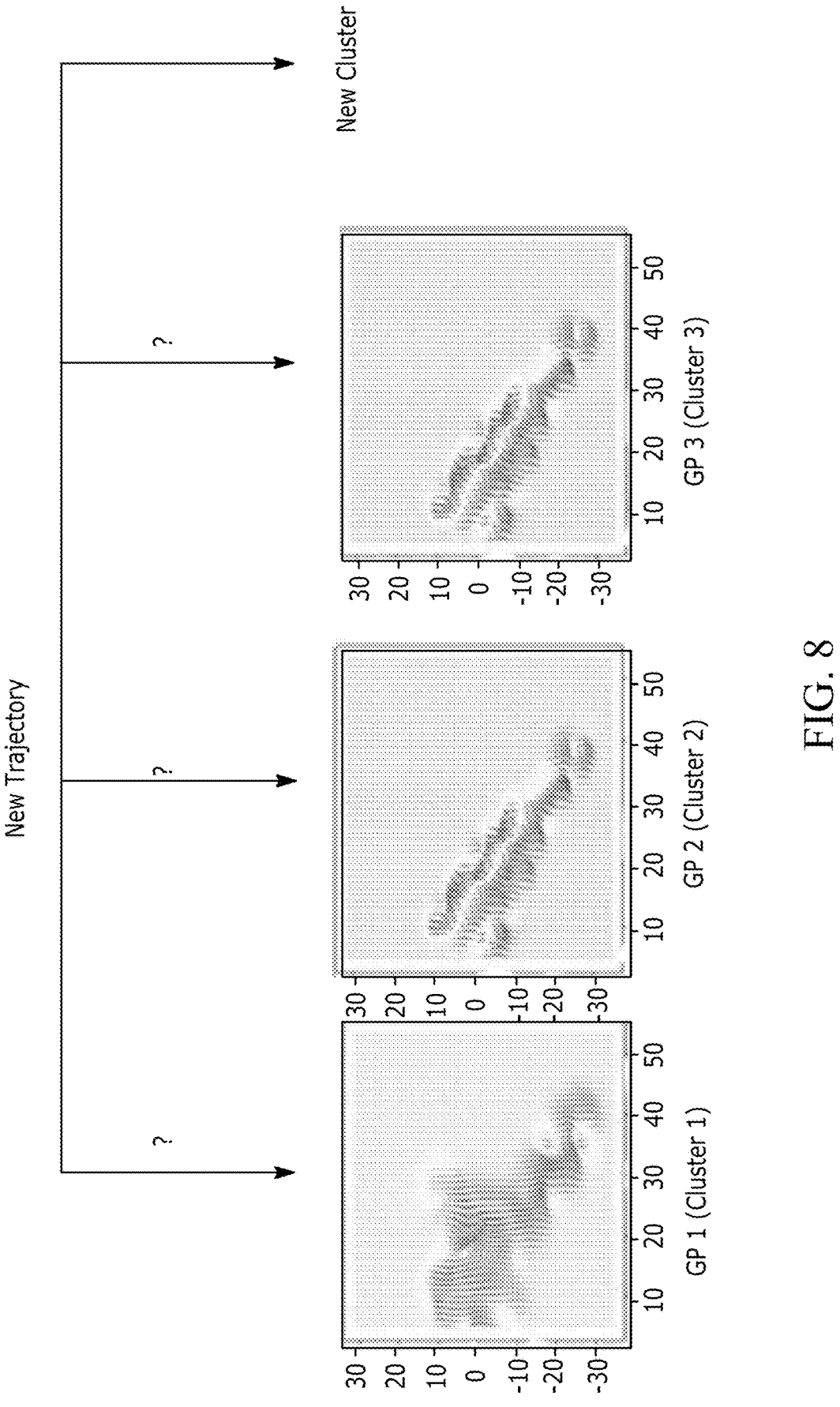
FIG. 8 illustrates a pipeline of a clustering method using trajectory data, according to an embodiment.
Figure 9:
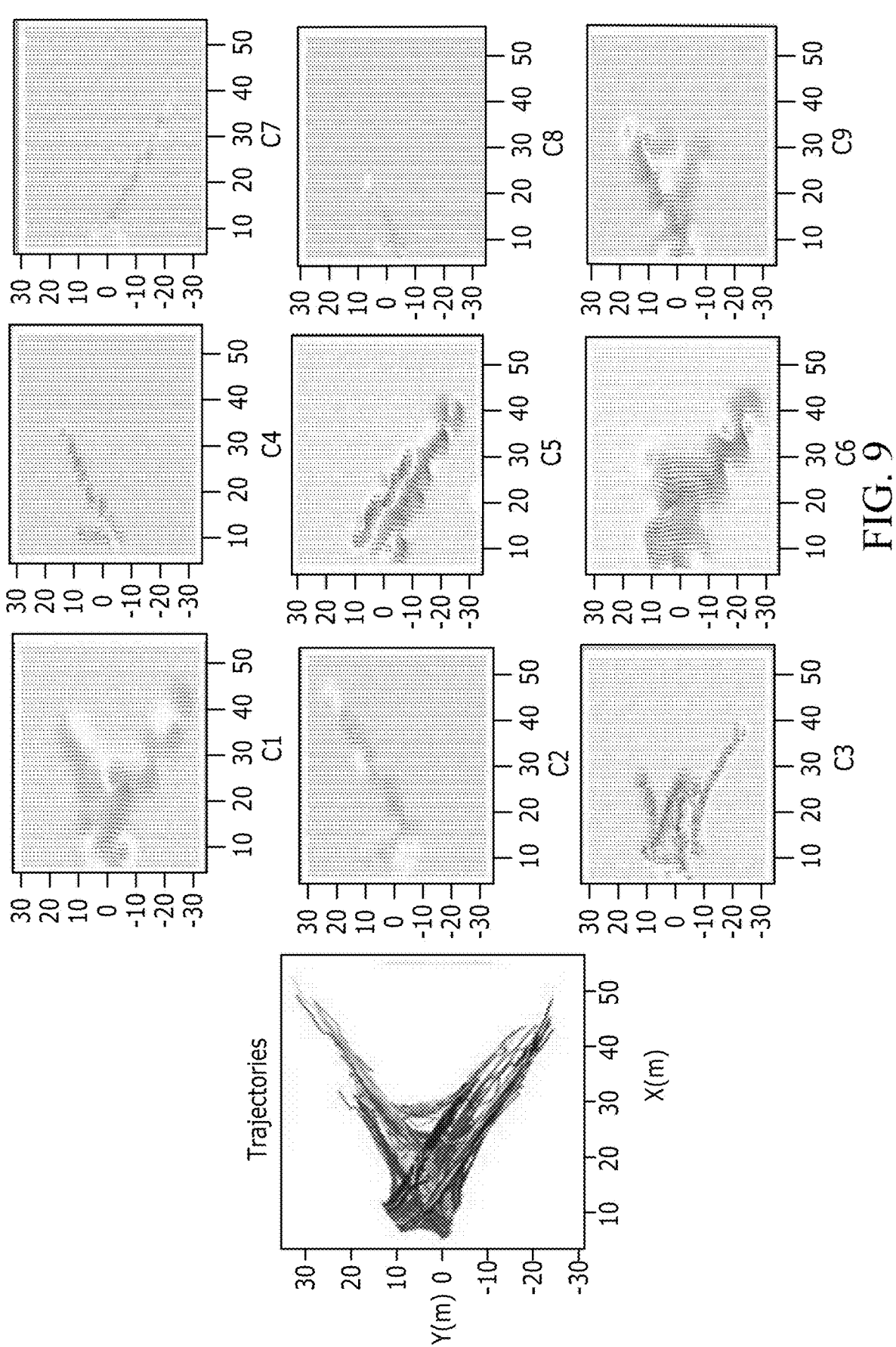
FIG. 9 illustrates examples of scene primitive clustering, according to embodiments.

In an embodiment, with DPGMM, the trajectories are modeled with independent Gaussian distributions, which ignore the temporal information. Another representation of driving patterns is considered, such as the velocity field (VF). In the two-dimensional space of the image, the object's position/location is represented as (x,y) and for each position, there is a corresponding $(v_x, v_y)$ that represents the velocity vector. Gaussian Processes (GP) can be used to learn this velocity field as a regression task, where (x,y) is the input and $(v_x, v_y)$ is the output. In this representation, it is not necessary to interpolate the trajectories since single points are considered. However, when using clustering algorithms, the trajectories are treated as a whole segment. In the illustration shown in FIG. 6A for example, the clustering method using VF is shown. When a new trajectory arrives, the processor calculates the similarity between the new trajectory and all clusters is calculated. This similarity is measured by the log-likelihood:

$$L_m = \sum_{n=1}^{N_m} p(f_*|y)$$

where $N_m$ is the number of points in trajectory m. Then, the new trajectory is assigned to a cluster that has the highest similarity. A threshold $\delta$ can also be set for creating new clusters; if the similarity between the new trajectory and all clusters is below this threshold, a new cluster can be created and this new trajectory can be assigned to that new cluster. FIG. 8 illustrates this, where a new trajectory can be assigned to a previously-created cluster (e.g., GP 1, GP 2, or GP 3), or can create a new cluster based on its dissimilarity with the previously-created clusters. FIG. 9 shows an example of various trajectories plotted in the x,y space based on the image data, and corresponding scene primitive clusters C1-C9.

In one embodiment, the results from the trajectory clustering can be validated or enhanced with external information such as map service information for cameras deployed on the road, or with human-in-the-loop such as crowdsourcing. For example, the system can receive map data from one or more external servers that collect and/or maintain road mapping data. The map data can include information regarding a number of traffic lanes, the location (e.g., coordinates) of the roads, and the like. This information can then be fused or combined with the object trajectory results to improve the performance of the trajectory clustering. For example, one or more of the trajectories in a cluster can be validated to be in that particular cluster based on an analysis of the mapping data corresponding to the traffic moving through one or more particular lanes. One trajectory that may seem like an outlier can be grouped in a cluster based on its travel to a particular lane that is similar to other trajectories in that cluster. The crowdsourcing can also review the clustered trajectories to assure their accuracy.

Figure 6B:
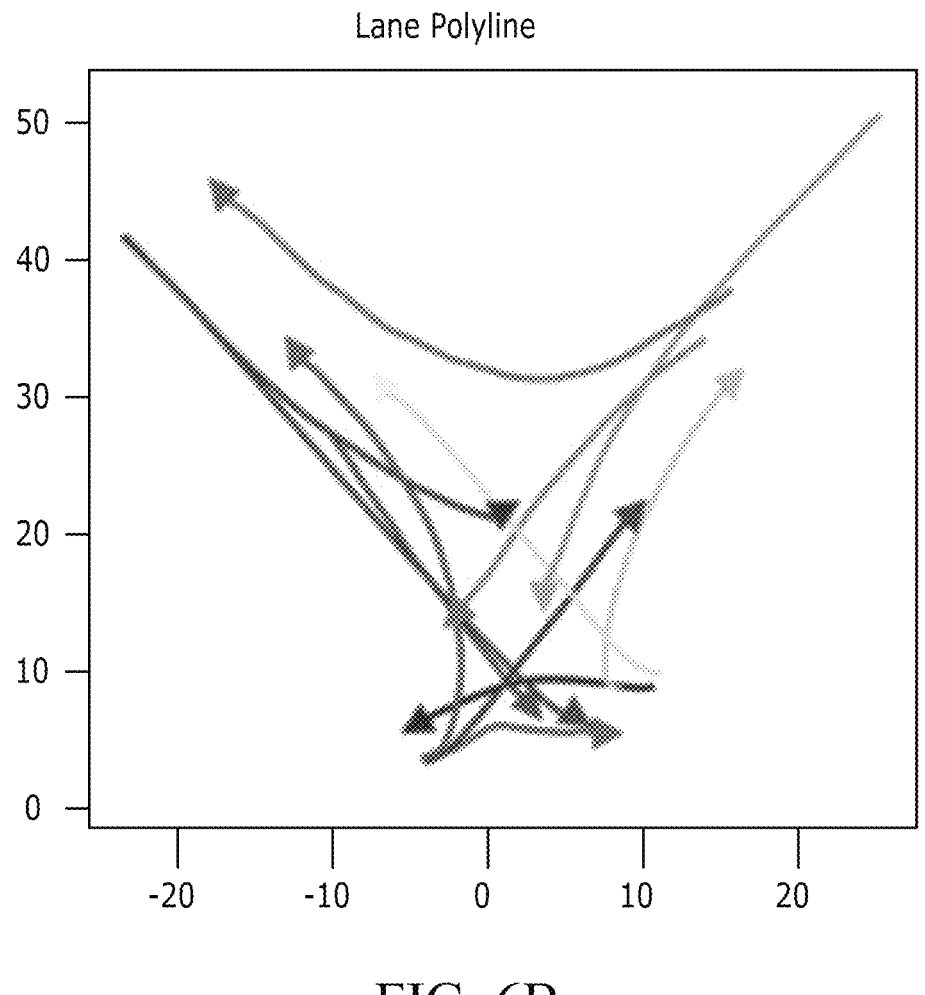
FIG. 6B is a polyline representing averages of each cluster, according to an embodiment.

The one or more processors can also create a polyline for each cluster of object trajectories. FIG. 6B shows a plurality of polylines, with each polyline corresponding to one of the clusters of FIG. 6A. Each polyline represents an average trajectory of all of the trajectories in that respective cluster.

The results of the trajectory clustering and abstraction with polylines and validation or enhancements (e.g., with map data and/or human-in-the-loop) allows for the processors to convert the meta-data from 410 into knowledge graph representational data at 418. In one example, a bounding box coordinate of an object in the image plane can be represented with an identifier (e.g., car_id_1) a location (e.g., lane_1) and a speed (e.g., 5 mph). This information, while being useful for the knowledge graph building, can also be useful in the user interface, and thus can be visualized on the user interface alongside the bounding boxes shown in FIG. 5.

Figure 7:
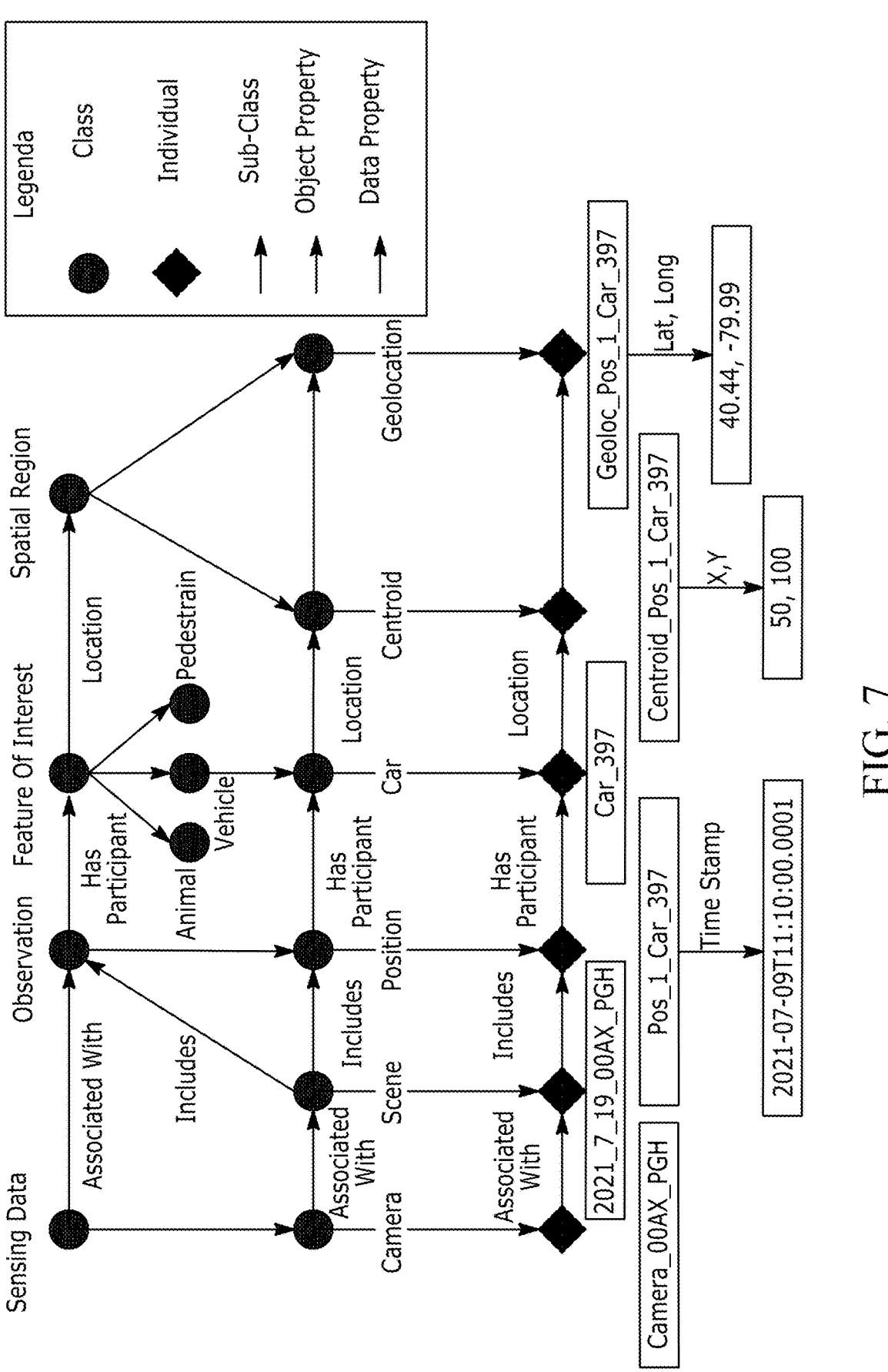
FIG. 7 illustrates an example of an ontology-based pattern for a knowledge graph representing the position of a car according to absolute and relative coordinates, according to an embodiment.

A knowledge graph can be generated by transforming that data at 418, e.g., consolidating heterogeneous information from 410 into a coherent semantic representation based on a domain-specific ontology. External information from 420 can also be relied on, such as map data, GPS coordinates, or human-in-the-loop as explained above. FIG. 7 represents an embodiment of resulting knowledge graph, visualized for a human user, e.g., on a user interface. Central primitives of the ontology of the knowledge graph can include scene and position/location. The scene primitives include a series of events that are clustered according to spatiotemporal proximity (e.g., bottom-up), or specific user requests. FIG. 7 illustrates an example of an ontology-based pattern or portion of a knowledge graph, in this particular embodiment a location of a vehicle according to absolute coordinates. In this example, the circles represent nodes in the knowledge graph, and the arrows represent edges of the knowledge graph. The information below the circles represent information that can be pulled from each node, corresponding to the node above.

An example of a specific user request can be a particular image or images that include all events that happened at a particular intersection between a certain time, such as from when a car accident occurred to when the ambulance arrived. The inputs (e.g., "car accident" and "ambulance arrival") can be provided in natural language from the user, and the data from the images themselves can allow the system to search for the requested events. For example, a car accident may show a drastic change of speed and/or a deviation from a cluster or polyline, or other context such as a vehicle subsequently having a speed of zero. The presence of an ambulance can be made by object recognition as disclosed herein. The position primitives can include the observed position or location of an object, which can have relative coordinates (e.g., centroids of a bounding box in the x-y image plane) or absolute coordinates (e.g., GPS, latitude and longitude).

The knowledge graph may be built with, for example, hybrid reasoning. The hybrid reasoning can include rule-based inferences (e.g., semantic reasoning 422) and sub-symbolic inferences (e.g., machine-learning models 424). With semantic reasoning 422, specific rules can be formalized using SPARQL query language, for example, to infer high-level activities. For instance, if a detected car has a velocity of 0.0 meters per second (m/s), and is located on a curve of the highway over an extended period of time, then the reasoning can infer the vehicle is stopped and constitutes a road hazard. Subsequent rules can also be triggered. For example, if a detected person has left the car and disappeared from the field of view for a long time, the car can be inferred to be abandoned; other context or rules may infer that the vehicle has malfunctioned (e.g., the person standing around the vehicle for some time), or the driver may have had a health emergency (e.g., an ambulance appearing some time after the vehicle has stopped).

Various machine-learning models can be created at 424. For example, a similarity-based clustering models can be trained with triples extracted from the knowledge graph, denoting a number of vehicles of different type present in the scene (e.g., cars, trucks, bicycles, motorcycles, etc.), and their corresponding speed, lane location, and duration of the observations. There are no constraints to the type of data that can be used to train the machine-learning models. If additional contextual elements are recognized from 410, and their distribution in the data is well-balanced, then they can be used as input features and contribute to the comprehensiveness and coherence of the scene recognition algorithms.

Of course it should be understood that car trajectories is but one example that can be modeled according to the teachings herein. The methods and systems described herein can be applied to any moving object, such as pedestrians, bicyclists, etc. Moreover, the teachings herein are not necessarily limited to outdoor environments. For example, the teachings herein can be applied for individuals within a place of business, such as tracking trajectories of people inside a place of business such as a retail store.

Figure 10A:
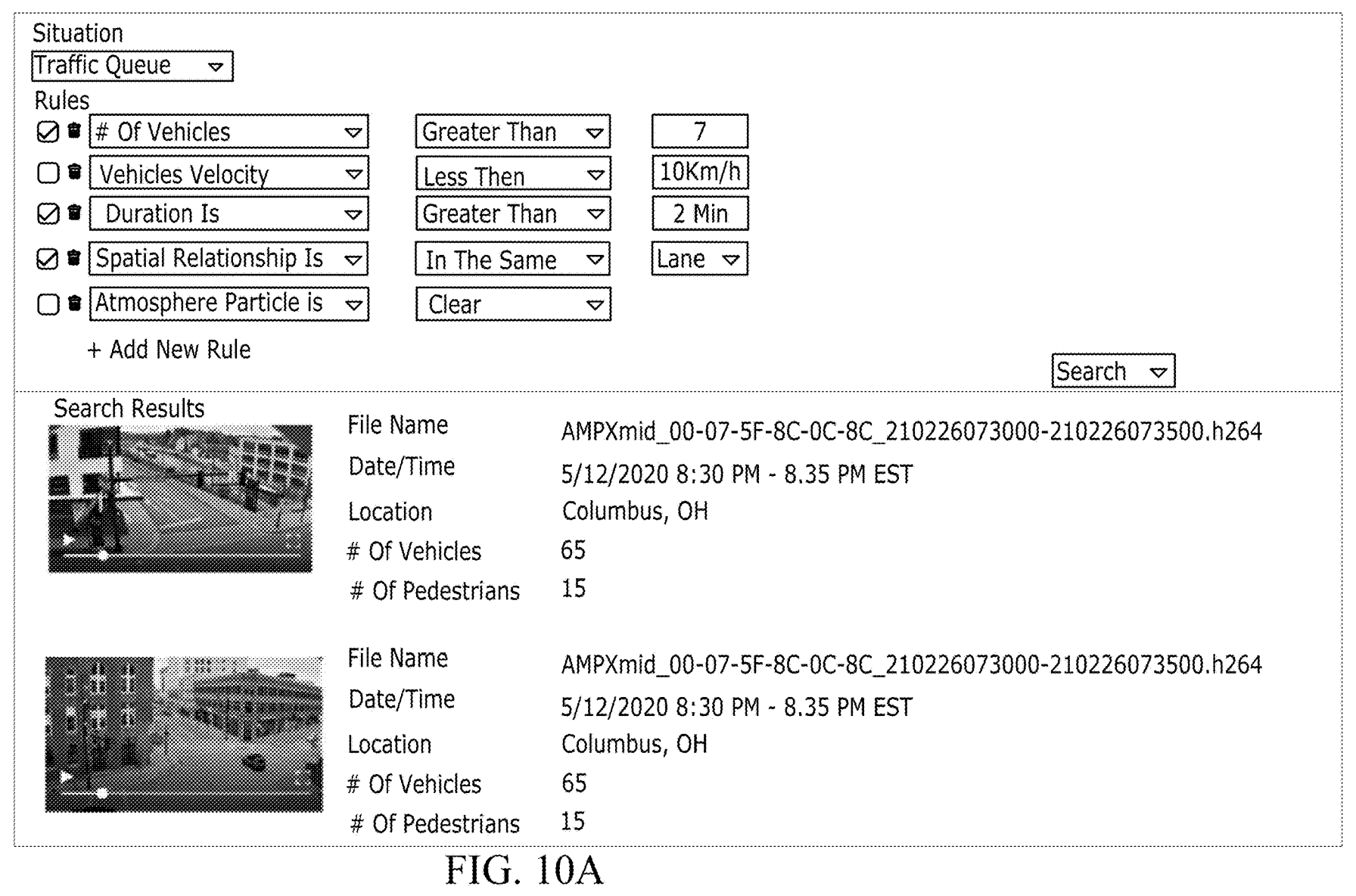

FIGS. 10A and 10B illustrate examples of user interfaces for enabling a human to search for various events based on the trajectories, such as traffic jams and parking violations. This can be an interactive tool to search for scenes such as accident near-misses, traffic jams, and the like. A user can create different rules as inputs, such as the number of vehicles in the scene, the velocity of one or more of the vehicles in the scene, the duration of time the vehicle is in the scene, the vehicle being in a particular lane, the vehicle being in the same or different lane as another vehicle, the weather, and other ontology rule-based inputs. Each input can be a knowledge graph primitive. The search results can show images or videos of relevant scenes that match the inputs based on a review of the knowledge graph. In the examples shown in FIG. 10, FIG. 10A shows various rules that may indicate a traffic jam or traffic queue, such as the number of vehicles in the scene being greater than seven, for longer than two minutes, and in the same lane. FIG. 10B shows various rules that may indicate a parking violation, such as a vehicle being located in a lane identified as a no-parking lane, the velocity being 0 m/s for a duration longer than 10 minutes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of building and augmenting a knowledge graph regarding ontology of events occurring in images, the method comprising:

receiving image data corresponding to a plurality of scenes captured by one or more cameras;

processing, by a neural network executed on one or more processors, the image data to detect objects and generate event-based features for each scene;

extracting, via computer vision, object trajectories from the image data;

receiving map data from an external server, wherein the map data is associated with the plurality of scenes;

via a clustering model and based on the map data, clustering the vehicle trajectories into a plurality of clustered vehicle trajectories;

building a knowledge graph with event-based ontology data corresponding to the event-based features and extracted object trajectories;

causing one or more of the scenes to be displayed to a plurality of crowdsourcing workers;

receiving natural-language inputs from the plurality of crowdsourcing workers, wherein the natural-language input includes event-based semantic annotations corresponding to the scene;

processing, via natural-language processing executed by the processor, the natural-language inputs to generate triples, wherein each of the triples includes a subject, a predicate, and an object; and augmenting, by the one or more processors, the knowledge graph based on the clustered vehicle trajectories and the generated triples, wherein the augmenting based on the generated triples is performed based on (a) nodes corresponding to one or more words of the generated triples and edges connecting the nodes, and (b) associating the nodes and edges derived from each generated triple with the event-based ontology data for a corresponding one of the plurality of scenes in the knowledge graph that is based on the event-based features and the extracted object trajectories for that scene to yield an augmented knowledge graph for use in determining event-based ontology associated with the plurality of scenes.

2. The method of claim 1, further comprising:

receiving new image data corresponding to a new scene captured by one or more of the cameras; and via the augmented knowledge graph, determining event-based ontology of the new scene.

3. The method of claim 1, wherein the plurality of scenes are of roads or intersections, and wherein the natural-language input is regarding vehicular traffic such that the augmented knowledge graph is configured for use in determining traffic-based ontology of the scene.

4. The method of claim 1, wherein the natural-language input is in a written form.

5. The method of claim 1, further comprising:

tagging, via the natural-language processing, words of the natural-language inputs;

retrieving synonyms of the tagged words;

aggregating the synonyms; and augmenting the knowledge graph with the aggregated synonyms.

6. The method of claim 1, further comprising:

generating synonyms of at least one of the triples; and augmenting the knowledge graph with the generated synonyms.

7. The method of claim 1, further comprising:

receiving an additional natural-language input from one of the crowdsourcing workers;

rejecting the additional natural-language input as being duplicative of one or more of the natural-language inputs of another of the crowdsourcing workers; and prompting the one of the crowdsourcing workers to provide another natural-language input including event-based semantic annotations corresponding to the scene.

8. The method of claim 1, further comprising:

causing for display, to the plurality of crowdsourcing workers, a user interface that includes the scene;

wherein the natural-language inputs from the plurality of crowdsourcing workers is received via the user interface.

9. A system of building and augmenting a knowledge graph regarding ontology of events occurring in images, the system comprising:

one or more image sensors configured to capture images of a plurality of scenes;

a plurality of user interfaces configured to receive inputs from crowdsourcing workers; and one or more processors programmed to:

extract, via computer vision, object trajectories from image data associated with the captured images;

build a knowledge graph with event-based ontology data corresponding to event-based features and extracted object trajectories, cause the scenes to be displayed to the crowdsource workers via the user interfaces, receive natural-language inputs from the crowdsource workers, wherein the natural-language input includes event-based semantic annotations corresponding to the displayed scenes, processing, via natural-language processing, the natural-language inputs to generate triples, and augment the knowledge graph based on the generated triples, wherein the augmenting based on the generated triples is performed based on (a) nodes corresponding to one or more words of the generated triples and edges connecting the nodes, and (b) associating the nodes and edges derived from each generated triple with the event-based ontology data for a corresponding one of the plurality of scenes in the knowledge graph that is based on the event-based features and the extracted object trajectories for that scene to yield an augmented knowledge graph for use in determining event-based ontology, wherein the augmented knowledge graph includes a plurality of nodes, each node corresponding to a respective generated triples.

10. The system of claim 9, wherein the one or more processors are further programmed to:

receive new image data corresponding to a new scene captured by one or more of the image sensors; and use the augmented knowledge graph to determine event-based ontology of the new scene.

11. The system of claim 9, wherein the plurality of scenes are of roads or intersections, and wherein the natural-language input is regarding vehicular traffic such that the augmented knowledge graph is configured for use in determining traffic-based ontology of the scene.

12. The system of claim 9, wherein the one or more image sensors includes a camera.

13. The system of claim 9, wherein the natural-language input is in a written form.

14. The system of claim 9, wherein the one or more processors are further programmed to:

utilize the natural-language processing to tag words of the natural-language inputs;

retrieve and aggregate synonyms of the tagged words; and augmented he knowledge graph with the aggregated synonyms.

15. The system of claim 9, wherein the one or more processors are further programmed to:

receive an additional natural-language input from one of the crowdsourcing workers;

reject the additional natural-language input as being duplicative of one or more of the natural-language inputs of another of the crowdsourcing workers; and prompt, via one of the user interfaces, the one of the crowdsourcing workers to provide another natural-language input including event-based semantic annotations corresponding to the scene.

16. A method of augmenting a knowledge graph with ontology information regarding events occurring in images, the method comprising:

retrieving, from memory, a knowledge graph with event-based ontology data corresponding to events occurring in a plurality of scenes captured by one or more cameras;

causing one or more of the scenes to be displayed to a plurality of users;

receiving natural-language inputs from the plurality of users, wherein the natural-language input includes event-based semantic annotations describing a portion of the scene;

processing, via natural-language processing executed by the processor, the natural-language inputs to generate triples; and augmenting the knowledge graph with nodes corresponding to one or more words of the generated triples, wherein the augmenting based on the generated triples is performed based on (a) nodes corresponding to one or more words of the generated triples and edges connecting the nodes, and (b) associating the nodes and edges derived from each generated triple with the event-based ontology data for a corresponding one of the plurality of scenes in the knowledge graph that is based on event-based features and the extracted object trajectories for that scene in order to yield an augmented knowledge graph for use in determining event-based ontology, wherein the augmented knowledge graph includes a plurality of nodes, each node corresponding to a respective generated triple.

17. The method of claim 16, further comprising:

receiving new image data corresponding to a new scene captured by one or more of the cameras; and via the augmented knowledge graph, determining event-based ontology of the new scene.

18. The method of claim 16, wherein the plurality of scenes are of roads or intersections, and wherein the natural-language input is regarding vehicular traffic such that the augmented knowledge graph is configured for use in determining traffic-based ontology of the scene.

* * * * *